US012756326B2

(12) United States Patent
Greetham

(10) Patent No.: US 12,756,326 B2
(45) Date of Patent: Oct. 6, 2026

(54) AC-TO-AC CONVERTER HAVING HIGHER OUTPUT FREQUENCY

(71) Applicant: Dyson Technology Limited, Malmesbury (GB)

(72) Inventor: Stephen Greetham, Gloucester (GB)

(73) Assignee: Dyson Technology Limited, Malmesbury (GB)

( * ) Notice: Subject to any disclaimer, the term of this patent is extended or adjusted under 35 U.S.C. 154(b) by 133 days.

(21) Appl. No.: 18/863,858

(22) PCT Filed: May 5, 2023

(86) PCT No.: PCT/IB2023/054704
§ 371 (c)(1),
(2) Date: Nov. 7, 2024

(87) PCT Pub. No.: WO2023/218307
PCT Pub. Date: Nov. 16, 2023

(65) Prior Publication Data
US 2026/0189152 A1 Jul. 2, 2026

(30) Foreign Application Priority Data
May 10, 2022 (GB) ..................................... 2206800

(51) Int. Cl.
*H02M 5/297* (2006.01)
*H02M 5/293* (2006.01)

(52) U.S. Cl.
CPC ......... *H02M 5/297* (2013.01); *H02M 5/2937* (2021.05)

(58) Field of Classification Search
CPC ............................ H02M 5/297; H02M 5/2937
See application file for complete search history.

(56) References Cited

U.S. PATENT DOCUMENTS 8,681,517 B2 3/2014 Itoh et al.
2015/0061569 A1* 3/2015 Alexander ................ H02J 7/02 320/109
2019/0181774 A1* 6/2019 Liu ..................... H02M 7/4833

FOREIGN PATENT DOCUMENTS

EP 2309633 A1 4/2011
WO 2022003316 A1 1/2022

* cited by examiner

*Primary Examiner* — Harry R Behm
(74) *Attorney, Agent, or Firm* — Tucker Ellis LLP

(57) ABSTRACT

An AC-to-AC converter includes input terminals, pairs of output terminals, a plurality of bridge arms, and a control unit. The bridge arms are connected in parallel to the input terminals and comprise a respective bridge arm for each pair of output terminals and a common bridge arm. Each bridge arm comprises a pair of switches and a node between the switches. Each pair of output terminals comprises a first output terminal connected to the node of the respective bridge arm, and a second output terminal connected to the node of the common bridge arm. The switches have a plurality of configurations for selectively connecting the output terminals to the input terminals in one of a plurality of arrangements. The control unit is operable to control the switches to apply an alternating output voltage to the output terminals. Over each half-cycle of the input voltage, the switches transition between different configurations.

15 Claims, 4 Drawing Sheets

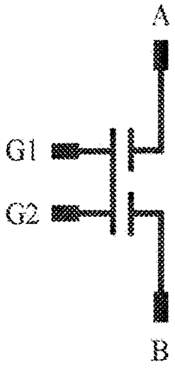
| G1 | G2 | Equivalent Circuit | State |
|---|---|---|---|
| OFF | OFF |   | Open |
| ON | ON |   | Closed |
| ON | OFF |   | Diode (A<-B) |
| OFF | ON |   | Diode (A->B) |
Fig. 2
| Configuration Number | Configuration | Switching State | Switches Closed | Voltage Polarity |
|---|---|---|---|---|
| 1 | Z1 | 1 | S1, S8 | + |
| | | 2 | S2, S7 | - |
| 2 | Z2 | 3 | S3, S8 | + |
| | | 4 | S4, S7 | - |
| 3 | Z3 | 5 | S5, S8 | + |
| | | 6 | S6, S7 | - |
| 4 | Z1//Z2 | 7 | S1, S3, S8 | + |
| | | 8 | S2, S4, S7 | - |
| 5 | Z1//Z3 | 9 | S1, S5, S8 | + |
| | | 10 | S2, S6, S7 | - |
| 6 | Z2//Z3 | 11 | S3, S5, S8 | + |
| | | 12 | S4, S6, S7 | - |
| 7 | Z1//Z2//Z3 | 13 | S1, S3, S5, S8 | + |
| | | 14 | S2, S4, S6, S7 | - |
| 8 | Z1+(Z2//Z3) | 15 | S1, S4, S6 | + |
| | | 16 | S2, S3, S5 | - |
| 9 | Z2+(Z1//Z3) | 17 | S2, S3, S6 | + |
| | | 18 | S1, S4, S5 | - |
| 10 | Z3+(Z1//Z2) | 19 | S2, S4, S5 | + |
| | | 20 | S1, S3, S6 | - |
| 11 | Z1+Z2 | 21 | S1, S4 | + |
| | | 22 | S2, S3 | - |
| 12 | Z1+Z3 | 23 | S1, S6 | + |
| | | 24 | S2, S5 | - |
| 13 | Z2+Z3 | 25 | S3, S6 | + |
| | | 26 | S4, S5 | - |
Fig. 3

| Configuration Number | Configuration | Input Power (W) |
|---|---|---|
| 1 | Z1//Z2//Z3 | 656 |
| 2 | Z1//Z2 | 574 |
| 3 | Z1//Z3 | 505 |
| 4 | Z1 | 423 |
| 5 | Z2//Z3 | 233 |
| 6* | Z1+(Z2//Z3) | 151 |
| 7 | Z2 | 150 |
| 8* | Z2+(Z1//Z3) | 116 |
| 9* | Z1+Z2 | 111 |
| 10 | Z3 | 81 |
| 11* | Z3+(Z1//Z2) | 71 |
| 12* | Z1+Z3 | 68 |
| 13* | Z2+Z3 | 53 |

Fig. 4

AC-TO-AC CONVERTER HAVING HIGHER OUTPUT FREQUENCY

RELATED APPLICATION DATA

This application is a national phase application of International Application No. PCT/IB2023/054704 filed May 5, 2023, which claims priority to GB Application No. 2206800.1 filed May 10, 2022.

FIELD OF THE INVENTION

The present invention relates to an AC-to-AC converter.

BACKGROUND OF THE INVENTION

An AC-to-AC converter typically comprises an AC-to-DC converter (e.g., rectifier), DC-link storage (e.g., capacitor and/or inductor), and a DC-to-AC converter (e.g., an inverter). The DC-link storage has the advantage of decoupling the two converters. However, the components of the DC-link storage can be physically large as well as costly.

SUMMARY OF THE INVENTION

The present invention provides an AC-to-AC converter comprising: input terminals for connection to a power supply, the power supply supplying an alternating input voltage; pairs of output terminals, each pair of output terminals for connection to a respective load; a plurality of bridge arms connected in parallel to the input terminals, the plurality of bridge arms comprising a respective bridge arm for each pair of output terminals and a common bridge arm; and a control unit, wherein: each bridge arm comprises a pair of switches and a node located between the switches; each pair of output terminals comprises a first output terminal connected to the node of the respective bridge arm, and a second output terminal connected to the node of the common bridge arm; the switches have a plurality of configurations for selectively connecting the output terminals to the input terminals in one of a plurality of arrangements, each configuration comprising a first switching state in which a positive voltage is applied to the output terminals and a second switching state in which a negative voltage is applied to the output terminals; the control unit is operable to control the switches to apply an alternating output voltage to the output terminals, the output voltage having a frequency higher than a frequency of the input voltage; and in at least one setting, the control unit is operable to control the switches such that, over each half-cycle of the input voltage, the switches transition between different configurations.

The present invention provides a direct AC-to-AC converter that outputs an alternating voltage without the need for separate AC-to-DC and DC-to-AC converters or DC-link storage. The input power drawn from the power supply can be regulated by selecting a different configuration for the switches. For example, the switches can be controlled such that the output voltage is applied to (i) a first pair of outputs terminals only, (ii) a second pair of output terminals only, (iii) the first and second pairs of output terminals connected in series, or (iv) the first and second pairs of output terminals connected in parallel.

The input power can be further regulated by transitioning between different configurations during each half-cycle of the input voltage. For example, when the switches are in a first configuration, the input power drawn from the power supply may be, say, 1000 W. When the switches are in a second configuration, the input power may be, say, 600 W. In order to achieve an input power between these two values, the control unit may control the switches such that they transition between the two configurations over each half-cycle of the input voltage. Conceivably, in an alternative arrangement, regulation of the input power may instead be achieved through the use of PWM. For example, an input power of 700 W may be achieved by selecting the first configuration (1000 W) and driving the switches at a duty cycle of 70%. However, the use of PWM introduces OFF periods during which no input current is drawn from the power supply. As a result, the total harmonic distortion (THD) of the input current increases. The converter may then require a larger input filter in order to ensure that the input current complies with regulatory requirements. With the converter of the present invention, on the other hand, regulation of the input power is instead achieved by switching between different configurations. Since current is drawn from the power supply in each of the configurations, power may be regulated for a lower THD. Accordingly, the same degree of power regulation may be achieved with a smaller input filter.

The control unit controls the switches such that the output voltage has a frequency greater than that of the input voltage. The control unit therefore switches between different switching states over each half-cycle of the input voltage. More particularly, the control unit switches between a switching state in which a positive output voltage is applied to the output terminals, and a further switching state in which a negative output voltage is applied to the output terminals. The control unit may switch between different switching states of the same configuration. Alternatively, the control unit may switch between switching states of different configurations. For example, in the example described above in which the output terminals have a first configuration (1000 W) and a second configuration (600 W), an input power of 700 W may be achieved by employing a sequence in which the first configuration is selected for one half-cycle of the output voltage and the second configuration is selected for the subsequent three half-cycles of the output voltage. This sequence may then be repeated over each half-cycle of the input voltage.

The switches may transition between the different configurations at a frequency greater than the frequency of the input voltage. As a result, the switches transition between configurations multiple times over each half-cycle of the input voltage. Transitioning between configurations introduces harmonics into the input current. The dominant harmonic typically occurs at the transition frequency, i.e., the frequency at which the switches transition between different configurations. By employing a transition frequency that is greater than the frequency of the input voltage, the harmonic spectrum may be shaped such that compliance with regulatory requirements may be achieved with an input filter of lower impedance. Additionally, or alternatively, by transitioning between configurations multiple times over each half-cycle of the input voltage, a more symmetrical profile for the input current may be achieved. As a result, a lower THD may be achieved.

The switches may transition between the different configurations at a frequency lower than the frequency of the output voltage. As noted in the preceding paragraph, transitioning between configurations introduces harmonics into the input current, with the dominant harmonic typically occurring at the transition frequency. Regulatory requirements regarding the permissible current harmonics that can be drawn from a mains supply are typically less forgiving of high frequency harmonics. Accordingly, by employing a transition frequency lower than the frequency of the output voltage, the dominant harmonic may be moved to a lower frequency and thus regulatory compliance may be achieved with an input filter of lower impedance.

The switches may transition between the different configurations at two or more frequencies. By employing more than one transition frequency, the harmonic spectrum of the input current may be better shaped such that regulatory compliance may be achieved with an input filter of lower impedance. For example, by transitioning between configurations at two different frequencies, the THD may be distributed over a larger range of frequencies.

An input power drawn from the power supply may be different for each configuration. As a result, better regulation may be achieved over the input power for a lower THD.

The switches may transition between adjacent configurations ranked by input power. That is to say that the plurality of configurations may be ranked according to input power. The control unit is then operable to control the switches such that, over each half-cycle of the input voltage, the switches transition between adjacent configurations within this ranking. Consequently, the change in input current when transitioning between configurations is likely to be smaller. The THD of the input current may then be reduced and thus an input filter of lower impedance may be employed.

The control unit may control the switches such that, over each half-cycle of the input voltage, the output voltage has duty cycle of less than 100%. That is to say that, within one or more of the different configurations, the switches may be driven at a duty cycle less than 100%. As noted above, the use of PWM introduces OFF periods during which no input current is drawn from the power supply. As a result, the harmonic content at the switching frequency is likely to increase. When configuration transitioning or PWM alone is used, the harmonic content at the transition frequency or the switching frequency may exceed that permitted by regulatory requirements, thus necessitating an input filter of higher impedance. By using both configuration transitioning and PWM, the THD may be distributed over a larger range of frequencies, thus permitting an input filter of lower impedance to be used.

The control unit may control the switches such that the output voltage has a frequency of at least 10 kHz. The control unit therefore switches between different switching states at a frequency of at least 20 kHz. The converter may therefore be used to power loads requiring kHz frequencies. For example, the converter may form part of a liquid heater, in which each of the loads comprises a pair of electrodes that are emersed within the liquid. Alternatively, the converter may form part of an induction cooker, with each of the loads comprising an induction coil.

The switches of each of the bridge arms may be bidirectional switches. This then has the advantage that, irrespective of the polarity of the input voltage, an alternating output voltage may be applied to the output terminals. Moreover, an output voltage having a higher frequency than that of the input voltage may be achieved without the need for AC-to-DC converter, a PFC circuit or DC-link storage.

The present invention also provides a system comprising an AC-to-AC converter as described in any one of the preceding paragraphs, and a plurality of loads, each of the loads being connected to a respective pair of output terminals.

The loads may have different impedances. By employing loads having different impedances, a greater number of configurations are possible for which the input power is different. Consequently, regulation of the input power may be achieved for a lower THD. In some examples, the loads may be resistive loads. For example, each load may be a pair of electrodes, and the electrodes may have different resistances. In other examples, the loads may be resonant loads. For example, each load may comprise an induction coil and a resonant capacitor.

The loads may comprise a resonant load having a resonant frequency, and the control unit may be operable to switch the switches between different switching states at a switching frequency greater the resonant frequency. By ensuring that the switching frequency is higher than the resonant frequency, zero-voltage switching may be achieved, thereby improving the efficiency of the system. The input power may then be regulated through the use of configuration transitioning without any need to change the switching frequency. As a result, power regulation can be achieved whilst also achieving zero-voltage switching.

The switches may transition between the different configurations at a frequency lower than the resonant frequency. This then allows the resonant load to progress through at least one complete resonant cycle before a transition in configuration.

The system may be an induction cooker and each of the loads may comprise an induction coil and a resonant capacitor. Alternatively, the system may be a liquid heater, and each of the loads may comprise a pair of electrodes.

BRIEF DESCRIPTION OF THE DRAWINGS

Embodiments will now be described, by way of example, with reference to the accompanying drawings in which:

FIG. 2 details the possible states for each switch of the converter;

FIG. 3 details various configurations and switching states of the converter;

FIG. 4 details example input powers for each of the configurations of the converter;

DETAILED DESCRIPTION OF THE INVENTION

Figure 1:
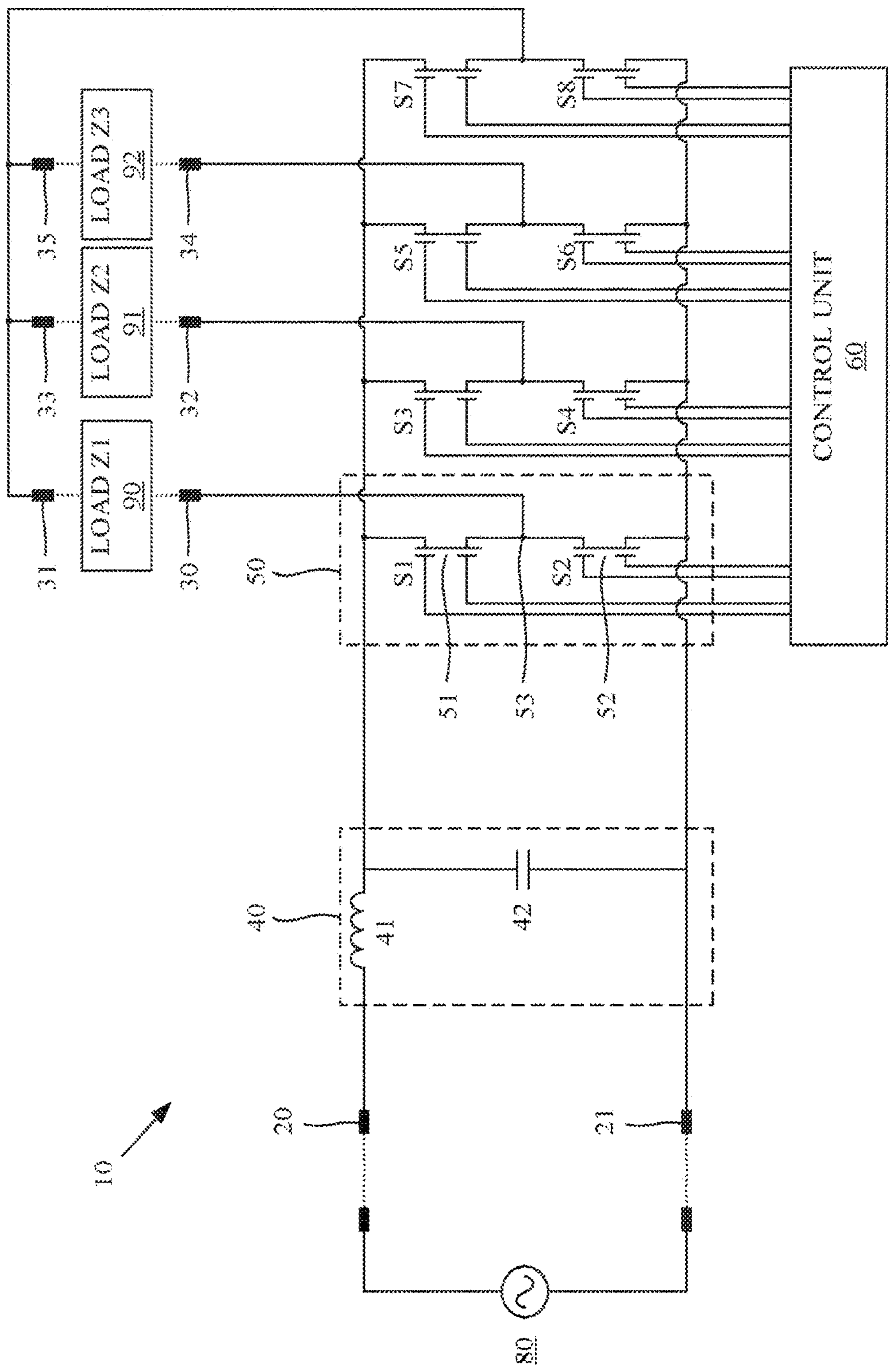
FIG. 1 is a circuit diagram of an AC-to-AC converter.

FIG. 1 illustrates an AC-to-AC converter 10 comprising input terminals 20,21, output terminals 30-35, an input filter 40, bridge arms 50, and a control unit 60.

The input terminals 20,21 are connectable to a power supply 80, such as a mains power supply, that supplies an alternating input voltage.

The output terminals 30-35 are grouped into pairs, and each pair of output terminals is connectable to a respective load 90,91,92. In the present example, the converter 10 comprises three pairs of output terminals 30,31; 32,33; and 34,35. However, the converter 10 may comprise any number of pairs of output terminals.

The input filter 40 attenuates high-frequency harmonics in the input current drawn from the power supply 80. In this example, the input filter 40 comprises an inductor 41 and a capacitor 42.

The bridge arms 50 are connected in parallel across the input terminals 20,21. The bridge arms 50 comprise a respective bridge arm (e.g., S1 and S2) for each pair of output terminals (e.g., 30 and 31), and a common bridge arm (e.g., S7 and S8) that is common to all pairs of output terminals 30-35. In this example, the converter 10 comprises three pairs of output terminals 30-35, and therefore the converter 10 comprises four bridge arms 50 in total.

Each bridge arm 50 comprises a pair of switches 51,52 and a node 53 located between the two switches 51,52. For each pair of output terminals, a first output terminal 30,32,34 is connected to the node 53 of its respective bridge arm, and a second output terminal 31,33,35 is connected to the node 53 of the common bridge arm.

The switches 51,52 of each bridge arm 50 are bi-directional. As illustrated in FIG. 2, each switch has four possible states: (1) open, in which the switch does not conduct in either direction; (2) closed, in which the switch conducts in both directions; (3) diode mode #1, in which the switch conducts in one direction only (e.g., B→A); and (4) diode mode #2, in which the switch conducts in the other direction only (e.g., A→B). Each switch 51,52 can therefore be controlled in both directions, which is to say that each switch 51,52 can be made conductive and non-conductive in one or both directions. The switches 51,52 thus differ from, say, a MOSFET having a body diode or IGBT having an anti-parallel diode which, although capable of conducting in both directions, can be made non-conductive in one direction only. In this example, the switches 51,52 are gallium nitride switches, which have a relatively high breakdown voltage and are thus well-suited for operation at mains voltages. Additionally, gallium nitride switches are capable of relatively high switching frequencies, the advantages of which are detailed below. Nevertheless, other types of bi-directional switch that are capable of being controlled in both directions might alternatively be used.

The switches S1-S8 of the bridge arms have different configurations for selectively connecting the output terminals 30-35 to the input terminals 20,21 in one of a plurality of arrangements. Each configuration comprises two complementary switching states. In a first switching state, a positive voltage is applied to the selected output terminals, and in a second switching state a negative voltage is applied to the selected output terminals FIG. 3 details the various configurations and switching states of the switches S1-S8 and the resulting arrangement of the output terminals 30-35. In FIG. 3 '//' refers to a parallel connection and '+' refers to a series connection. So, for example, the configuration '(Z1//Z2)+Z3' should be understood to mean that the first pair of output terminals 30,31 (and therefore the first load Z1) is connected in parallel with the second pair of output terminals 32,33 (and therefore with the second load Z2). This parallel grouping is then connected in series with the third pair of output terminals 34,35 (and thus with the third load Z3).

The polarities of the output voltage detailed in FIG. 3 are based on a positive input voltage on the upper line of the converter 10; the polarities will, of course, be reversed should the input voltage on the upper line be negative. A positive voltage may be said to be applied to a pair of output terminals if the voltage applied to the first electrode 30,32,34 is positive. In FIG. 3, the polarity of the output voltage refers to that applied to the first of the listed pairs of output terminals, as well as to any pairs of output terminals that are connected in parallel to the first-listed pair. The voltage applied to the output terminals connected in series with the first-listed pair will, however, have the opposite polarity. Accordingly, where reference is made to applying an output voltage to selected pairs of output terminals, it should be understood that the polarity of the output voltage may be the same or different for different output terminals. So, for example, in the configuration '(Z1//Z2)+Z3', the polarity of the output voltage applied to the third pair of outlets 34,35 will be opposite to that applied to the first and second pairs of electrodes 30-33.

The control unit 60 is responsible for controlling the operation of the converter 10. In response to one or more input signals, the control unit 60 selects one of the plurality of configurations and outputs control signals to control the states of the switches S1-S8.

As noted above, there are two switching states for each configuration: one in which a positive voltage is applied to the first-listed pair of output terminals, and another in which a negative voltage is applied to the first-listed pair of output terminals. The control unit 60 controls the switches S1-S8 such that they switch between these two switching states. As a result, an alternating output voltage is applied to each of the output terminals of the selected configuration. Moreover, the control unit 60 switches between the two switching states such that the output voltage has a higher frequency than that of the input voltage. In this example, the control unit 60 control the switches S1-S8 such that the output voltage has a frequency of at least 10 kHz.

Since the switches S1-S8 are bi-directional, an alternating output voltage may be applied to the output terminals 30-35 irrespective of the polarity of the input voltage. The switches S1-S8 are gallium nitride switches, which are not only capable of operating at relatively high switching frequencies, but have relatively low switching losses at these frequencies. When switching between different switching states, the control unit 60 controls the states of the switches S1-S8 so as to avoid shoot-through whilst also providing a path for any inductive current. This involves placing one or more of the switches S1-S8 momentarily into diode mode and is described in more detail in WO2022/003316A1.

When switching between different switching states, there is a period, often referred to as dead time, during which no current is drawn from the power supply 80. This dead time is relatively short in duration but nevertheless introduces a high-frequency ripple in the input current drawn from the power supply 80. The input filter 40 then attenuates this high-frequency ripple. Owing to the relatively short duration of the dead time, the input filter 40 is able to attenuate the high-frequency ripple using components of relatively low impedance, thus reducing the size and cost of the converter 10.

There are thirteen different configurations listed in the table of FIG. 3. For each configuration, the input power drawn from the power supply 80 by the loads 90,91,92 may be different; this is particularly true if the loads have different impedances. The control unit 60 may then select a different configuration based on a desired input power. For example, the control unit 60 may receive an input signal indicative of a power demand or a power setting, and the control unit 60 may select a configuration in response.

FIG. 4 provides an example of possible input powers for each of the configurations. It will be appreciated that the input powers are provided by way of example only and will depend on the voltage of the power supply 80 and the impedances of the loads 90,91,92 to which the converter 10 is connected. The input powers detailed in FIG. 4 are based on an input voltage of 230 V and resistive loads of 125Ω, 350Ω and 650Ω for Z1, Z2 and Z3 respectively.

In this particular example, the converter 10 has thirteen different configurations, each of which has a different input power. The large number of configurations is made possible through the provision of the common bridge arm (i.e., switches S7 and S8). Without the common bridge arm, the converter 10 would have just six different configurations;

these are indicated with an asterisk in FIG. 4. In addition to a fewer number of configurations, the range in the input power would decrease significantly without the common bridge arm. For example, with the values detailed in FIG. 4, the range in input power would decrease from 53 W-656 W (with common bridge arm) to 53 W-151 W (without common bridge arm). By providing just two additional switches S7 and S8, the total number of configurations are more than doubled and the range in input power is significantly increased.

In addition to the input power that is achieved for each configuration, it may be desirable to draw input powers at other values. Alternative input powers may be achieved using a number of different methods, as will now be described.

In a first method, alternative input powers may be achieved by controlling the switches S1-S8 such that the output voltage is output over every Nth half-cycle of the input voltage. For example, the control unit 60 may select configuration #1 of FIG. 4 and control the switches S1-S8 such that the output voltage is output over every half-cycle of the input voltage. As a result, an input power 656 W is drawn from the power supply 80. Alternatively, the control unit 60 may control the switches S1-S8 such that the output voltage is output over every second half-cycle of the input power, resulting in an input power of 328 W. This particular method of power regulation has the advantage that alternative input powers may be achieved without any increase in the total harmonic distortion (THD) of the input current. However, this particular method provides only relatively coarse regulation of the input power. For example, it is not possible to use this method to achieve an input power of, say, between 656 W (configuration #1) and 574 W (configuration #2).

In a second method, alternative input powers may be achieved by controlling the switches S1-S8 such that the output voltage is output during a portion only of each half-cycle of the input voltage. For example, in response to a zero-crossing in the input voltage, the control unit 60 may wait for a period of time (OFF period) before closing the switches to output the output voltage. By adjusting the length of this OFF period, the control unit 60 is able to adjust the input power that is drawn from the power supply 80. Although this second method is capable of delivering greater regulation over the input power than that of the first method, controlling the output voltage in this way increases the THD of the input current. Moreover, as the duration of the OFF period increases, the THD increases and thus the required impedance of the input filter 40 increases.

In a third method, alternative input powers may be achieved by controlling the switches S1-S8 such that the output voltage has duty cycle less than 100%. That is to say that the control unit 60 may switch between the two complementary switching states of a particular configuration to output an alternating output voltage. The control unit 60 may then use PWM to control the fraction of the half-cycle period of the output voltage during which the switches are closed, thereby varying the duration of each pulse of the output voltage. The output voltage therefore has periods (in addition to the relatively short dead time) during which no input current is drawn from the power supply 80. As a result, harmonic distortion is introduced into the input current which must then be filtered by the input filter 40. As the duty cycle of the output voltage decreases, the THD increases and thus the required impedance of the input filter 40 increases.

In a fourth method, alternative input powers may be achieved by controlling the switches S1-S8 such that, over each half-cycle of the input voltage, the switches transition between different configurations. Consider, for example, a situation in which an input power of 595 W is desired using the configurations detailed in FIG. 4. The control unit 60 may achieve this input power by transitioning between configurations #1 and #2 over each half-cycle of the input voltage. There are many different transition sequences which the control unit 60 may employ to achieve an input power of 595 W. Two possible sequences will now be described, by way of example, with reference to FIG. 5.

Figure 5:
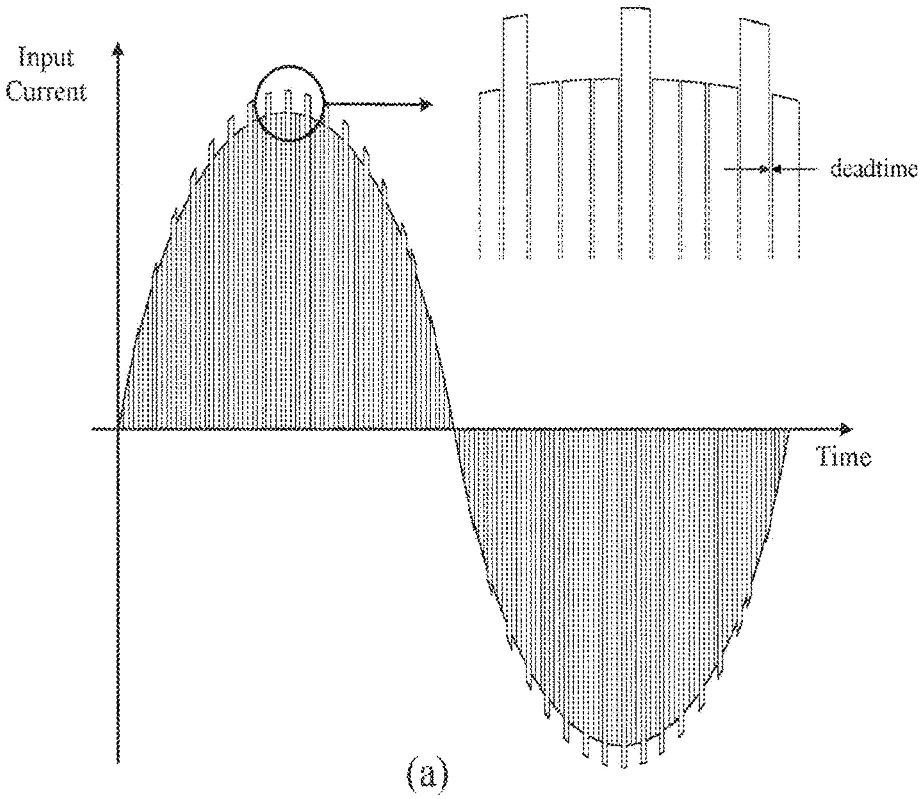
FIG. 5 illustrates the input current when transitioning between different configurations according to (a) a first sequence, and (b) a second sequence.
Figure 5:
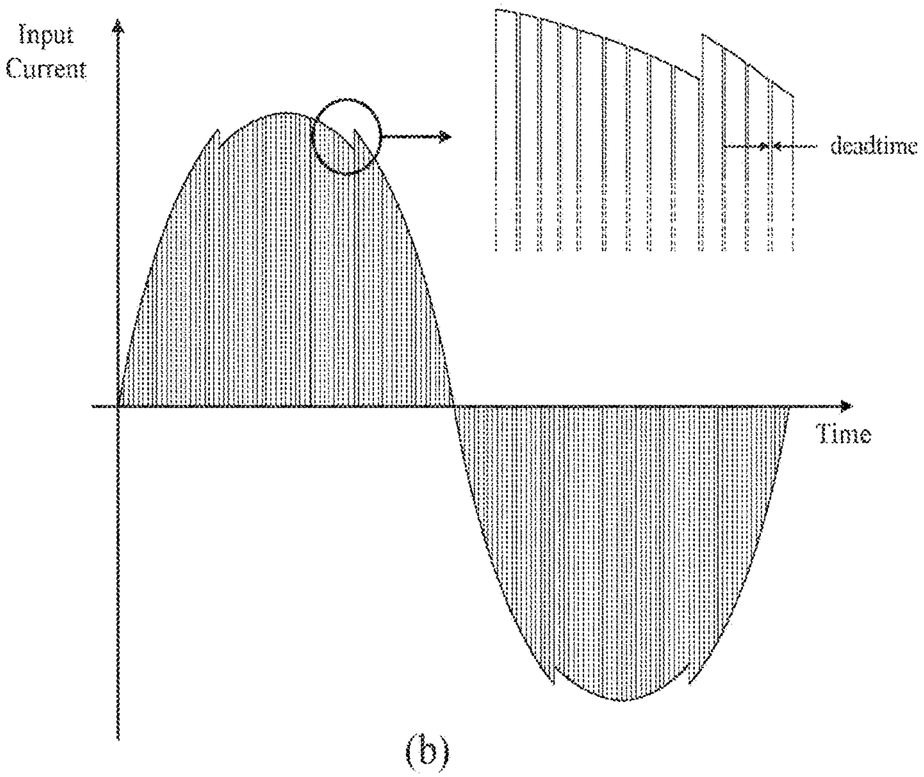

In one example, the control unit 60 may control the switches S1-S8 such that, for every two cycles of the output voltage, configuration #2 is employed for three half-cycles of the output voltage and configuration #1 is employed for the fourth half-cycle. The control unit 60 might therefore employ the following sequence of switching states of FIG. 3: 3, 4, 3, 2. This sequence is then repeated over each half-cycle of the input voltage. Configuration #1 is therefore employed for a quarter of the time and configuration #2 is employed for three-quarters of the time, resulting in an input power of 595 W. The net result is that the profile of the input current resembles a sine wave having a relatively small, high frequency ripple. This is illustrated in FIG. 5(*a*), which shows the input current over one cycle of the input voltage. The switching frequency in FIG. 5 is relatively low for the purposes of illustration and would typically be much higher.

In another example, the control unit 60 may control the switches S1-S8 such that configuration #1 is employed at the start and end portions of each half-cycle of the input voltage, and configuration #2 is employed over the central portion of each half-cycle. As a result, the profile of the input current resembles a flattened sine wave. This is illustrated in FIG. 5(*b*). The same input power may therefore be achieved for a lower peak input current. In each of the examples described above and illustrated in FIG. 5, additional harmonic distortion is introduced into the input current. Accordingly, like the second and third methods discussed above, greater power regulation comes at the expense of increased THD. However, in contrast to the second and third methods, current is drawn continuously throughout each half-cycle of the input voltage when employing the fourth method. There are no OFF periods (other than the relatively short dead time) during which no input current is drawn. As a result, in comparison to the second and third methods, the same regulation in input power may be achieved for a lower THD and thus an input filter of lower impedance may be employed.

As noted above, when employing the fourth method, the control unit 60 may employ different transition sequences in order to achieve a desired input power. In the first of the two examples described above, the switches S1-S8 transition between configurations #1 and #2 at a relatively high frequency. By contrast, in the second example, the switches S1-S8 transition between configurations #1 and #2 at a relatively low frequency. The dominant harmonic introduced with this method of power regulation typically occurs at the transition frequency, i.e., the frequency at which the switches S1-S8 transition between different configurations. The transition sequence (and therefore the transition frequency) employed by the control unit 60 may be selected or defined in order to achieve a particular harmonic spectrum for the input current. For example, regulatory requirements are typically more forgiving of low frequency harmonics. Accordingly, of the two examples described above and illustrated in FIG. 5, regulatory compliance may be possible using an input filter of lower impedance when employing the second sequence.

The control unit 60 may control the switches S1-S8 such that the transition between different configurations occurs at more than one transition frequency. Again, this may be done so as to better shape the harmonic spectrum of the input current. For example, by transitioning between configurations #1 and #2 at two different frequencies, dominant harmonics are created at two different frequencies. However, the amplitude of each of the dominant harmonics is reduced.

In the examples described above, the switches S1-S8 transition between two configurations over each half-cycle of the input voltage. The two configurations are adjacent configurations, when all configurations are ranked by input power. So, for example, when using the configurations detailed in FIG. 4 to achieve an input power of 595 W, the control unit 60 controls the switches such that they transition between configurations #1 and #2. The same input power could be achieved by controlling the switches S1-S8 such that they transition between configuration #1 and any other configuration. However, the change in input current when transitioning between the configurations is then likely to be greater. As a result, the THD is likely to be greater, thus necessitating an input filter 40 of higher impedance. By transitioning between adjacent configurations ranked by input power, the THD may be reduced. Nevertheless, the control unit 60 may control the switches S1-S8 such that they transition between non-adjacent configurations. This may be done, for example, in order to better shape the harmonic spectrum of the input current.

The control unit 60 may control the switches S1-S8 such that they transition between more than two configurations over each half-cycle of the input voltage. Again, this may be done, for example, in order to better shape the harmonic spectrum of the input current.

In the example sequences described above, the switches S1-S8 transition between different configurations multiple times over each half-cycle of the input voltage. The transition frequency is therefore higher than the frequency of the input voltage but lower than the frequency of the output voltage. Conceivably, the control unit 60 may control the switches S1-S8 such that they transition between configurations only once during each half-cycle of the input voltage. However, the profile of the input current would then be asymmetric resulting in a potentially higher THD. By transitioning between configurations multiple times, a more symmetrical current profile and thus a lower THD may be achieved.

The control unit 60 may employ the fourth method in combination with one or more of the other power regulation methods described above. Again, this may be done in order to better shape the harmonic spectrum of the input current. For example, the control unit 60 may employ configuration transitioning (fourth method) in addition to PWM (third method). When configuration transitioning alone is used, the harmonic content at the transition frequency may exceed that permitted by regulatory requirements, thus necessitating an input filter of higher impedance. Similarly, when PWM alone is used, the harmonic content at the switching frequency may exceed that permitted by regulatory requirements. By using both configuration switching and PWM, the THD may be distributed over a larger range of frequencies, thus permitting a smaller input filter to be used.

The AC-to-AC converter 10 operates as a direct AC-to-AC converter and is able to output a high-frequency alternating output voltage without the need to rectify the input voltage, or provide active power factor correction (PFC) or DC-link storage. Despite the absence of a dedicated PFC stage, the input power may be regulated whilst still achieving a relatively low THD for the input current. As a result, good regulation of the input power may be achieved with an input filter of relatively low impedance.

The AC-to-AC converter 10 may be employed in a system having a plurality of loads requiring kHz frequencies.

In one example, the system may be a liquid heater and each pair of output terminals may be connected to a pair of electrodes. Each pair of electrodes may have a different electrical resistance, which is to say that, when the electrodes are immersed in the liquid to be heated, the electrical resistance across each pair of electrodes may be different. The AC-to-AC converter 10 is capable of outputting an alternating voltage having a frequency of at least 100 kHz. By applying a voltage of this frequency to the electrodes, relatively high power may be transferred to the liquid without electrolysis occurring.

The heater may be required to heat liquids of different conductivities. For example, the conductivity of mains water can vary significantly from country to country, and even from region to region within the same country. The resistance of each pair of electrodes, and thus the input power drawn by the heater for each configuration, will depend on the conductivity of the liquid. The control unit 60 may therefore employ one or more of the power regulation methods described above in order to achieve better thermal control. For example, irrespective of the conductivity of the liquid, the control unit 60 may control the switches S1-S8 such that the same input power is drawn from the power supply 80.

In another example, the system may comprise resonant loads. By way of example, the system may be an induction cooker and each of the loads may comprise an induction ring. Each induction ring may comprise a series resonant load, such as an induction coil and a series resonant capacitor. Conventionally, the power transferred from the ring to a pan is controlled by changing the switching frequency of the converter. To achieve zero-voltage switching, the switching frequency is typically set slightly higher than the resonant frequency of the ring. Power in the pan is then reduced by increasing the switching frequency, thereby moving the switching frequency further from the resonant frequency whilst maintaining zero-voltage switching. Although this is effective at reducing the power in the pan, it does so at the expense of increased reactive power. As a result, the efficiency of the system decreases.

During use, there may be periods when multiple rings operate at low power and thus the efficiency of the cooker may be significantly reduced. In this situation, the efficiency of the cooker may be improved by operating the rings at a lower input power whilst maintaining the switching frequency close to the resonant frequency. This can be achieved by employing one or more of the power regulation methods described above.

Whilst particular embodiments have thus far been described, it will be understood that various modifications may be made without departing from the scope of the invention as defined by the claims.

The invention claimed is:

1. An AC-to-AC converter comprising:

input terminals for connection to a power supply, the power supply supplying an alternating input voltage;

pairs of output terminals, each pair of output terminals for connection to a respective load;

a plurality of bridge arms connected in parallel to the input terminals, the plurality of bridge arms comprising a respective bridge arm for each pair of output terminals and a common bridge arm; and a control unit, wherein:

each bridge arm comprises a pair of switches and a node located between the switches;

each pair of output terminals comprises a first output terminal connected to the node of the respective bridge arm, and a second output terminal connected to the node of the common bridge arm;

the switches have a plurality of configurations for selectively connecting the output terminals to the input terminals in one of a plurality of arrangements, each configuration comprising a first switching state in which a positive voltage is applied to the output terminals and a second switching state in which a negative voltage is applied to the output terminals;

the control unit is operable to control the switches to apply an alternating output voltage to the output terminals, the output voltage having a frequency higher than a frequency of the input voltage; and in at least one setting, the control unit is operable to control the switches such that, over each half-cycle of the input voltage, the switches transition between different configurations.

2. The AC-to-AC converter as claimed in claim 1, wherein the switches transition between the different configurations at a frequency greater than the frequency of the input voltage.

3. The AC-to-AC converter as claimed in claim 1, wherein the switches transition between the different configurations at a frequency lower than the frequency of the output voltage.

4. The AC-to-AC converter as claimed in claim 1, wherein the switches transition between the different configurations at two or more frequencies.

5. The AC-to-AC converter as claimed in claim 1, wherein an input power drawn from the power supply is different for each configuration.

6. The AC-to-AC converter as claimed in claim 5, wherein the different configurations are adjacent configurations of the plurality of configurations ranked by input power.

7. The AC-to-AC converter as claimed in claim 1, wherein, in the at least one setting, the control unit controls the switches such that, over each half-cycle of the input voltage, the output voltage has a duty cycle of less than 100%.

8. The AC-to-AC converter as claimed in claim 1, wherein the output voltage has a frequency of at least 10 KHz.

9. The AC-to-AC converter as claimed in claim 1, wherein the switches are bi-directional switches.

10. A system comprising an AC-to-AC converter as claimed in claim 1, and a plurality of loads, each of the loads being connected to a respective pair of output terminals.

11. The system as claimed in claim 10, wherein the loads have different impedances.

12. The system as claimed in claim 10, wherein the loads comprise a resonant load having a resonant frequency, and the control unit is operable to switch the switches between different switching states at a switching frequency greater the resonant frequency.

13. The system as claimed in claim 12, wherein the switches transition between the different configurations at a frequency lower than the resonant frequency.

14. The system as claimed in claim 10, wherein the system is an induction cooker, and each of the loads comprises an induction coil.

15. The system as claimed in claim 10, wherein the system is a liquid heater, and each of the loads comprises a pair of electrodes.

* * * * *